(12) United States Patent
Nelson et al.

(10) Patent No.: US 10,445,145 B2
(45) Date of Patent: *Oct. 15, 2019

(54) HYBRID CONFIGURATION ENGINE

(71) Applicant: Microsoft Technology Licensing, LLC, Redmond, WA (US)

(72) Inventors: Jason Craig Nelson, Kirkland, WA (US); Ben Appleby, Manchester (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 12 days.

This patent is subject to a terminal disclaimer.

(21) Appl. No.: 15/782,386

(22) Filed: Oct. 12, 2017

(65) Prior Publication Data

US 2018/0032377 A1    Feb. 1, 2018

Related U.S. Application Data

(63) Continuation of application No. 13/361,236, filed on Jan. 30, 2012, now Pat. No. 9,792,156.

(60) Provisional application No. 61/555,255, filed on Nov. 3, 2011.

(51) Int. Cl.
| | | |
|---|---|---|
| *G06F 9/50* | (2006.01) | |
| *G06Q 10/06* | (2012.01) | |
| *H04L 12/771* | (2013.01) | |
| *H04W 24/04* | (2009.01) | |
| *G06F 8/61* | (2018.01) | |
| *H04L 29/08* | (2006.01) | |

(52) U.S. Cl.
CPC .............. *G06F 9/5072* (2013.01); *G06F 8/61* (2013.01); *G06Q 10/06* (2013.01); *H04L 45/563* (2013.01); *H04L 67/34* (2013.01); *H04W 24/04* (2013.01)

(58) Field of Classification Search
CPC ........ G06F 8/61; G06F 9/5072; H04W 24/04; H04L 45/563; H04L 67/34; G06Q 10/06
See application file for complete search history.

(56) References Cited

U.S. PATENT DOCUMENTS

| | | |
|---|---|---|
| 6,889,172 B2 | 5/2005 | Sierer et al. |
| 2002/0001307 A1 | 1/2002 | Nguyen et al. |
| 2010/0064035 A1 | 3/2010 | Branca et al. |

(Continued)

OTHER PUBLICATIONS

"Archive for the 'Office 365 Grid' Category", Retrieved from: <<http://360on365.com/category/office-365-grid/>>, Oct. 7, 2011, 5 Pages.

(Continued)

*Primary Examiner* — Philip J Chea
*Assistant Examiner* — Mohammed Ahmed
(74) *Attorney, Agent, or Firm* — Merchant & Gould

(57) ABSTRACT

A hybrid configuration engine and associated method for reducing the complexity and burden of configuring rich coexistence between an on-premise solution and a cloud-based solution is described herein and illustrated in the accompanying figures. The hybrid configuration engine determines the current state of the on-premise solution and the cloud-based solution and learns the desired configuration state. After obtaining the current and desired configuration state information, the hybrid configuration engine determines and automatically performs steps to reach the desired configuration state. Finally, the hybrid configuration engine provides instructions describing the manual steps needed to reach the desired configuration state.

20 Claims, 10 Drawing Sheets

(56) References Cited

U.S. PATENT DOCUMENTS

2010/0332629 A1   12/2010   Cotugno et al.
2012/0123898 A1    5/2012   Kirkeby et al.
2012/0222106 A1    8/2012   Kuehl

OTHER PUBLICATIONS

"Cluster Services", Retrieved Form: <<http://technet.microsoft.com/en-us/library/bb734909.aspx>>, Oct. 5, 2011, 21 Pages.

"New Flexible Deployment and Migration Options with Exchange 2010 Service Pack 2", Retrieved From: <<http://blog.mimecast.com/2011/05/microsoft-office365-migration-doesn%E2%80%99t-have-to-be-scary/>>, Oct. 7, 2011, 2 Pages.

"Upgrade in Place to SharePoint Server 2010", Retrieved From: <<http://technet.microsoft.com/en-us/library/cc263212.aspx>>, May 12, 2010, 8 Pages.

"Final Office Action Issued in U.S. Appl. No. 13/361,236", dated Jan. 9, 2015, 13 Pages.

"Non-Final Office Action Issued in U.S. Appl. No. 13/361,236", dated Jun. 19, 2015, 14 Pages.

"Non-Final Office Action Issued in U.S. Appl. No. 13/361,236", dated Nov. 30, 2016, 13 Pages.

"Non-Final Office Action Issued in U.S. Appl. No. 13/361,236", dated Jul. 31, 2014, 64 Pages.

"Notice of Allowance Issued in U.S. Appl. No. 13/361,236", dated Jun. 16, 2017, 8 Pages.

Mackechnie, Nick, "Announcing Exchange 2010 Service Pack 2", Retrieved From: <<http://blogs.msdn.com/b/nickmac/archive/2011/05/19/announcing-exchange-201O-service-pack-2.aspx>>, Oct. 7, 2011, 2 Pages.

HYBRID CONFIGURATION ENGINE

CROSS-REFERENCE TO RELATED APPLICATIONS

This application is a continuation of application Ser. No. 13/361,236, filed Jan. 30, 2012, now U.S. Pat. No. 9,792,156, which application claims the benefit of provisional application Ser. No. 61/555,255, filed Nov. 3, 2011, which applications are incorporated herein by reference in their entirety.

BACKGROUND

As computer networks have evolved, it has become increasing common for business software applications traditionally run as on-premise solutions to be adapted to run as cloud (i.e., online) based solutions. Cloud-based solutions have historically been the domain of large enterprises encompassing multiple organizations. Although the benefits of cloud-based solutions are attractive to organizations of all sizes, unfamiliarity has deterred many organizations from adopting self-managed cloud-based solutions. While some organizations lacking the internal expertise needed to administer a cloud-based solution may choose to purchase services from a third party vendor of a shared cloud-based solution, this option is not available to all organizations for various reasons.

One such reason is a lack of integration between cloud-based solutions and the existing on-premise solution. The organization may have reasons to run both the on-premise solution and the cloud-based solution in tandem. For example, in a lengthy migration from an on-premise e-mail solution to a cloud-based e-mail solution, user accounts will be selectively moved to the cloud-based solution. Ideally, users should enjoy full interoperability with other users within the organization regardless of the allocation of user accounts. Currently, the connection of separate solutions requires an administrator to individually connect to each solution and make the necessary configuration changes. Not only does this scenario require the typical on-premise system administrator to gain knowledge and experience with management concepts specific to cloud-based solutions, but configuring the on-premise solution and the cloud-based solution for interoperability adds an additional, and often significant, layer of complexity to the task—especially when the configuration experience is fragmented as a result of separate component teams independently developing interoperability features for the business software application. It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Embodiments of the present invention solve the above and other problems by providing a derivation of steps needed to configure a cloud-based system and an on-premises system in order to communicate. Embodiments provide a hybrid configuration engine for analyzing a current state of each system versus a desired end state, making appropriate configuration changes to each system, and validating an end result to match the desired end state. Embodiments provide for configuring an on-premise computing structure with a cloud infrastructure in one method.

A desired end state, as may be specified by a hybrid configuration object, may be established. The desired end state may be broken into a number of configuration steps. Each system may be analyzed to see if it meets the desired result already. If not, the engine may make appropriate configuration changes and notify an administrator when manual intervention may be required (e.g., DNS record modifications). Once changes are made, the state may be analyzed again to make certain that they system represents the desired end state.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A hybrid configuration engine and associated method for reducing the complexity and burden of configuring rich coexistence between an on-premise solution and a cloud-based solution is described herein and illustrated in the accompanying figures. The hybrid configuration engine determines the current state of the on-premise solution and the cloud-based solution and learns the desired configuration state. After obtaining the current and desired configuration state information, the hybrid configuration engine determines and automatically performs steps to reach the desired configuration state. Finally, the hybrid configuration engine provides instructions describing the manual steps needed to reach the desired configuration state.

Figure 1:
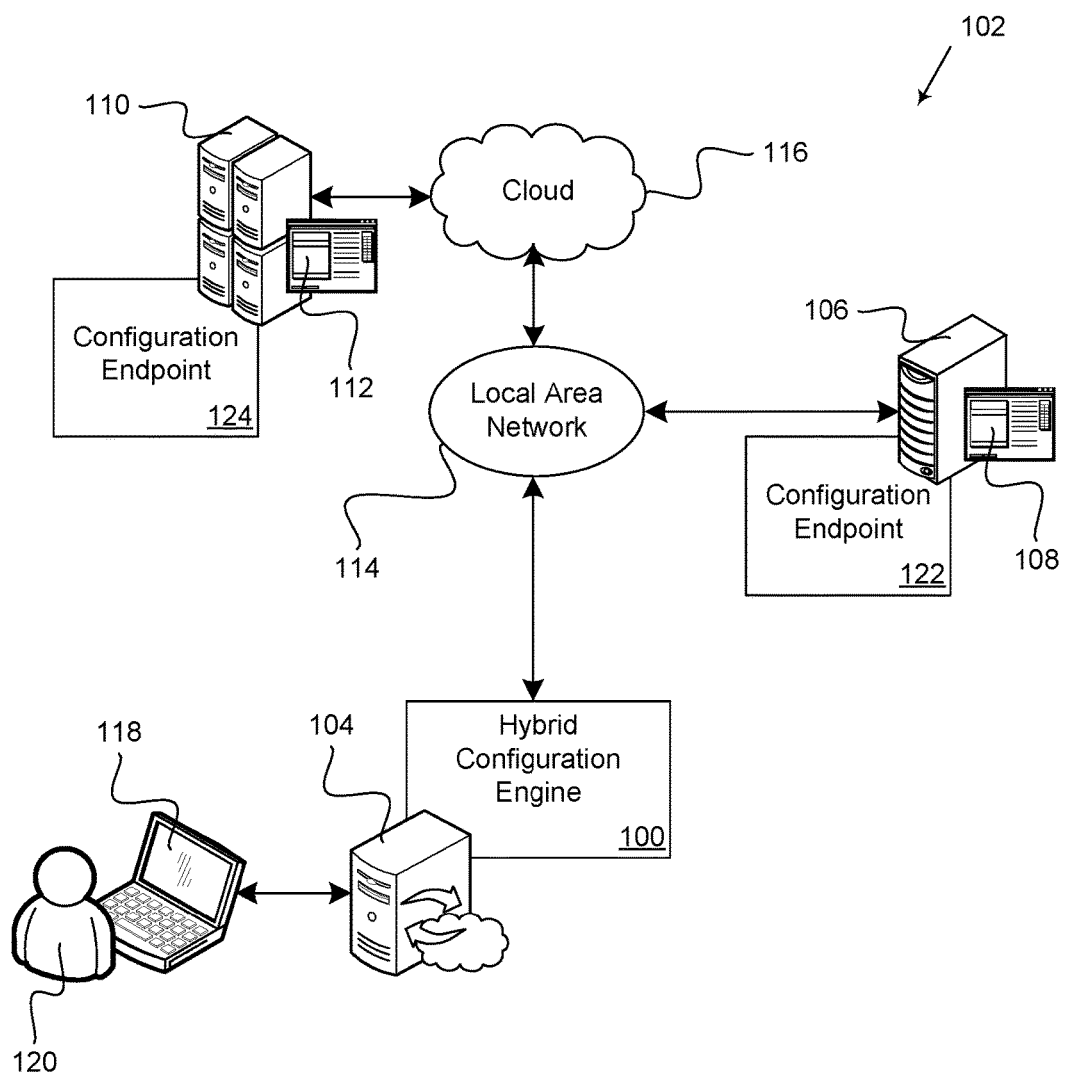
FIG. 1 illustrates a system employing one embodiment of the hybrid configuration engine.

FIG. 1 illustrates a system incorporating the hybrid configuration engine 100 within an exemplary usage environment 102. The exemplary usage environment 102 includes a hybrid deployment solution, an on-premise solution, and a cloud-based solution. The hybrid deployment solution includes a hybrid deployment server 104 that serves as the platform for the hybrid configuration engine 100. The on-premise solution includes an application server 106 that serves as the platform for the on-premise application 108. The cloud-based solution includes an application server 110 that serves as the platform for the cloud-based application 112. The hybrid deployment server 104 and the on-premise application server 106 are connected to a local area network 114, and the cloud-based application server 110 is connected to the cloud (i.e., the internet) 116. The local area network 114 links to the cloud 116. In the illustrated embodiment, an administrator (i.e., operator) 120 remotely connects to the hybrid deployment server 104 using a client computing system 118. The hybrid configuration engine 100 connects to the configuration endpoint 122 of the on-premise application server 106 and the configuration endpoint 124 of the cloud-based application server 108. It should be appreciated by those skilled in the art that the exemplary usage environment 102 of FIG. 1 illustrates only the major components and that additional details such as directory information services servers, domain controllers, web servers, client computers, firewalls, switches, and other typical components found in an on-premise network or a cloud network may be present but are not shown.

Figure 2:
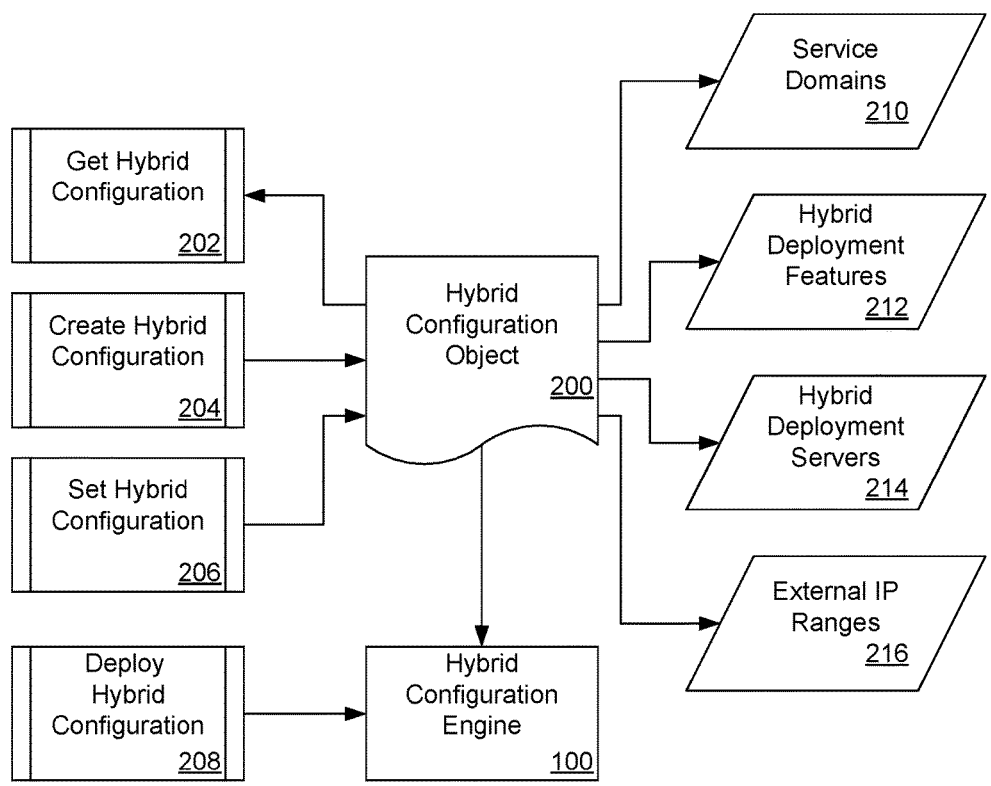
FIG. 2 is a relationship diagram for the hybrid configuration engine.

FIG. 2 is a relationship diagram for the hybrid configuration engine 100. The hybrid configuration engine 100 maintains configuration information in a hybrid configuration object 200. In some embodiments, the core commands to manipulate the hybrid configuration object 200 are implemented as scripts or other similar command structures. In the illustrated embodiment, the hybrid configuration engine 100 implements a get hybrid configuration task 202, a create hybrid configuration task 204, a set hybrid configuration task 206, and a deploy hybrid configuration task 208. The get hybrid configuration task 202 reads the current values of the hybrid configuration object 200. The create hybrid configuration task 204 creates a new hybrid configuration object 200. The set hybrid configuration task 206 sets the values of the hybrid configuration object 200. The deploy hybrid configuration task 208 is used to deploy relationship configuration object 200. In the illustrated embodiment, the hybrid configuration object 200 stores information about the service domains 210, the hybrid deployment features 212, the hybrid deployment servers 214, and the external IP address ranges 216. One skilled in the art will recognize that the commands used to manipulate the hybrid configuration object 200 and the information stored by the hybrid configuration object 200 may vary without departing from the scope and spirit of the present invention.

Figure 3:
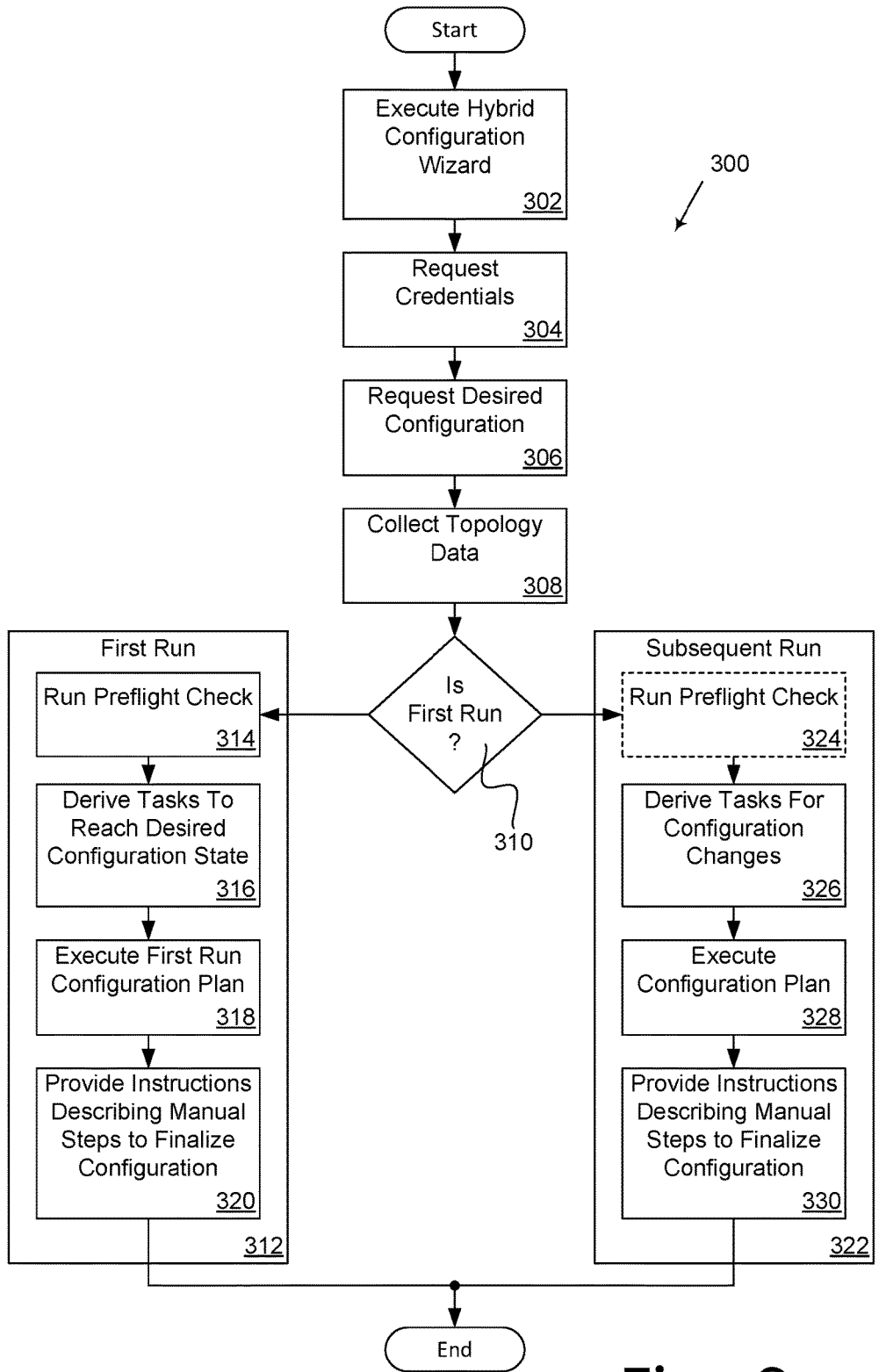
FIG. 3 is a flow diagram showing one embodiment of the hybrid configuration method executed by the hybrid configuration engine.

FIG. 3 is a flow diagram of one embodiment of the hybrid configuration method 300 executed by the hybrid configuration engine 100. First, the hybrid configuration engine 100 executes a configuration wizard providing a user interface (302) to interact with the administrator 120 and obtain deployment specific information about the on-premise solution 106 and the cloud-based solution 108. In order to gain access to configure the on-premise solution 106 and the cloud-based solution 108 for hybrid deployment, the hybrid configuration engine 100 requests appropriate credentials (304) from the administrator 120. Subsequently, the hybrid configuration engine 100 collects information about the desired (i.e., hybrid) configuration state (306) from the administrator 120. In some embodiments, the scripts are used to bypass the hybrid deployment wizard (302) and one or more subsequent steps including requesting credentials (304) and requesting configuration information (306) described in relation to FIG. 2. In such instances, the administrator passes information to the hybrid configuration engine 100 by running the scripts from a command line and including the information as parameters.

Once the desired configuration has been obtained, the hybrid configuration engine 100 collects and analyzes topology information (308) from the on-premise solution and the cloud-based solution. The hybrid configuration engine 100 uses the topology information to determine if the target environment has been previously configured for hybrid deployment. In other words, a determination of whether this is the first or a subsequent run of the hybrid configuration engine 100 is made (310). On a first run, the hybrid configuration engine 100 executes a first run flow (312). As part of the first run flow (312), the hybrid configuration engine 100 executes a preflight check (314) to verify that the target environment meets a minimum set of prerequisites and is ready for configuration.

Next, the hybrid configuration engine 100 determines or derives the configuration tasks needed to achieve the desired configuration state (316) and incorporates the derived tasks into a first run configuration plan (318). To derive the configuration tasks, the hybrid configuration engine 100 determines the difference between the desired state and the current state. The hybrid configuration engine 100 selects a sequence of configuration tasks to reach the desired state and incorporates the selected configuration tasks into a configuration plan. In one embodiment, the first run configuration plan contains default tasks and derived tasks not included in the default tasks are enabled or added while unnecessary default tasks are disabled or removed. Once the first run configuration plan has been established, the hybrid configuration engine 100 performs the specified configuration tasks. After completing the first run configuration plan, the hybrid configuration engine 100 informs the administrator 120 about additional manual configuration steps (316) to be completed in order to finalize configuration (320) of the on-premise solution 106 and the cloud-based solution 108 for hybrid deployment. In some embodiments, the information is provided in a summary screen displayed by the hybrid configuration engine 100. In other embodiments, the hybrid configuration engine 100 provides links to instructions and other helpful information. In various embodiments, the information also describes how the administrator can test (e.g., end user based tests) to ensure that the hybrid deployment and/or a portion thereof is working.

A primary effort of the first run configuration plan is to create all of the core hybrid configuration objects as part of the individual configuration tasks included in the first run configuration plan. Core hybrid configuration objects that are not needed to accomplish the desired configuration result are disabled. A hybrid deployment feature is enabled or disabled by modifying and/or setting a flag within the hybrid configuration object. In some embodiments, enabling or disabling a hybrid configuration only occurs when a state change in the hybrid deployment feature is recorded by directory services.

The creation of the core hybrid configuration objects distinguishes the first run from subsequent runs. In most embodiments, it is not necessary create any core configuration objects during a subsequent run (322). On subsequent runs, the hybrid configuration engine 100 adjusts the hybrid configuration simply by enabling or disabling individual configuration objects or features as need to accomplish the desired hybrid deployment. The ability to disable individual configuration objects and features eliminates the need for the hybrid configuration engine 100 to delete configuration objects. By eliminating the need to delete hybrid configuration objects, the hybrid configuration engine 100 is not required to implement complex undo/redo functionality and maintain undo/redo information.

The flow of the subsequent run (322) is similar to that of the first run (312) and includes a preflight check (324), deriving configuration tasks (326), executing the configuration plan (328), and providing information describing additional steps to finalize configuration (330). Some steps in the subsequent run (322) vary from the steps of the first run (312). For example, in some embodiments, the derivation of configuration tasks (326) in subsequent runs is also based on whether and how the desired configuration state been has changed. In some embodiments, the derivation of configuration tasks (326) in subsequent runs is based on whether and how the topology of the target environment has changed. Similarly, some embodiments of the subsequent run modify the tests performed during the preflight check (324).

In some embodiments, information such as the desired configuration state and the administrative credentials is optionally cached. On subsequent runs, the user interface is prefilled with the cached information, and the administrator need only confirm the information to reapply the previous configuration or make appropriate changes to modify the current configuration. In other embodiments, the cached information is used to allow either or both of the steps of collecting credentials (304) and collecting configuration information (306) to be skipped.

Figure 4:
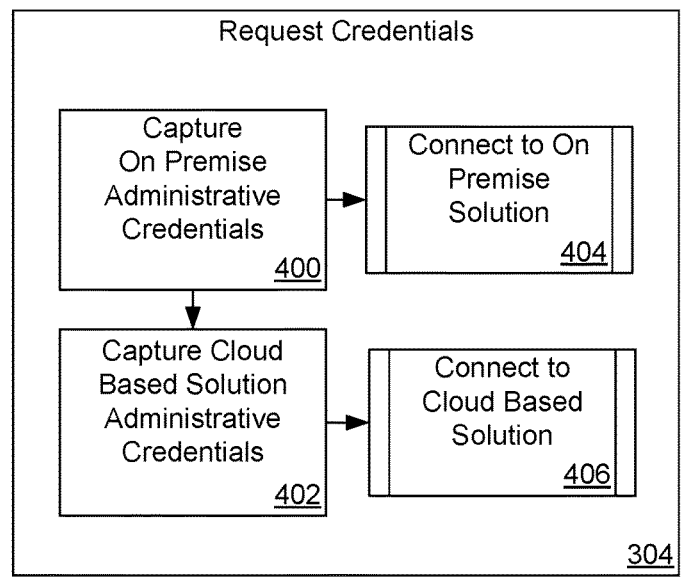
FIG. 4 is a flow diagram showing one embodiment showing the step of requesting credentials in greater detail.

FIG. 4 is a flow diagram showing one embodiment of the sub-steps that make up the step of requesting credentials (304) from the administrator 120. First, the hybrid configuration engine 100 captures the administrative credentials for the on-premise solution (400). Next, the hybrid configuration engine 100 captures the administrative credentials for the cloud-based solution (402). Once the appropriate administrative credentials have been obtained, the hybrid configuration engine 100 creates a connection to the configuration endpoint 122 of the on-premise solution (404) and creates a connection to the configuration endpoint 124 of the cloud-based solution (406).

Figure 5:
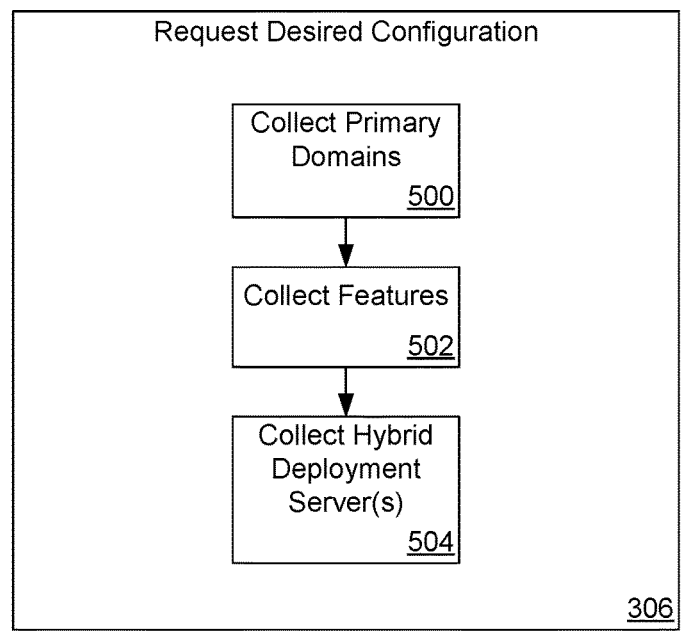
FIG. 5 is a flow diagram showing one embodiment of step of collecting configuration information in greater detail.

FIG. 5 is a flow diagram showing one embodiment of the sub-steps that make up the step of collecting configuration information from the administrator (306). First, the hybrid configuration engine 100 collects the primary domains (500) to participate in the hybrid deployment. In one embodiment, the hybrid configuration engine 100 collects the primary domains by displaying a list of accepted domains gathered from the on-premise solution and allowing the administrator to select the domains that should participate in the hybrid deployment. Next, the hybrid configuration engine 100 collects the features to be shared (i.e., coexist) between the on-premise solution and the cloud-based solution (502). In one embodiment, the hybrid configuration engine 100 collects the features by displaying a list of available features and allowing the administrator to select the features to be shared. Finally, the hybrid configuration engine 100 collects one or more servers to serve as hybrid deployment server(s) (504). In one embodiment, the hybrid configuration engine 100 collects the hybrid deployment server(s) by displaying a list of qualified servers and allowing the administrator to select the server(s) for the hybrid configuration 100 engine to configure as hybrid deployment server(s).

Figure 6:
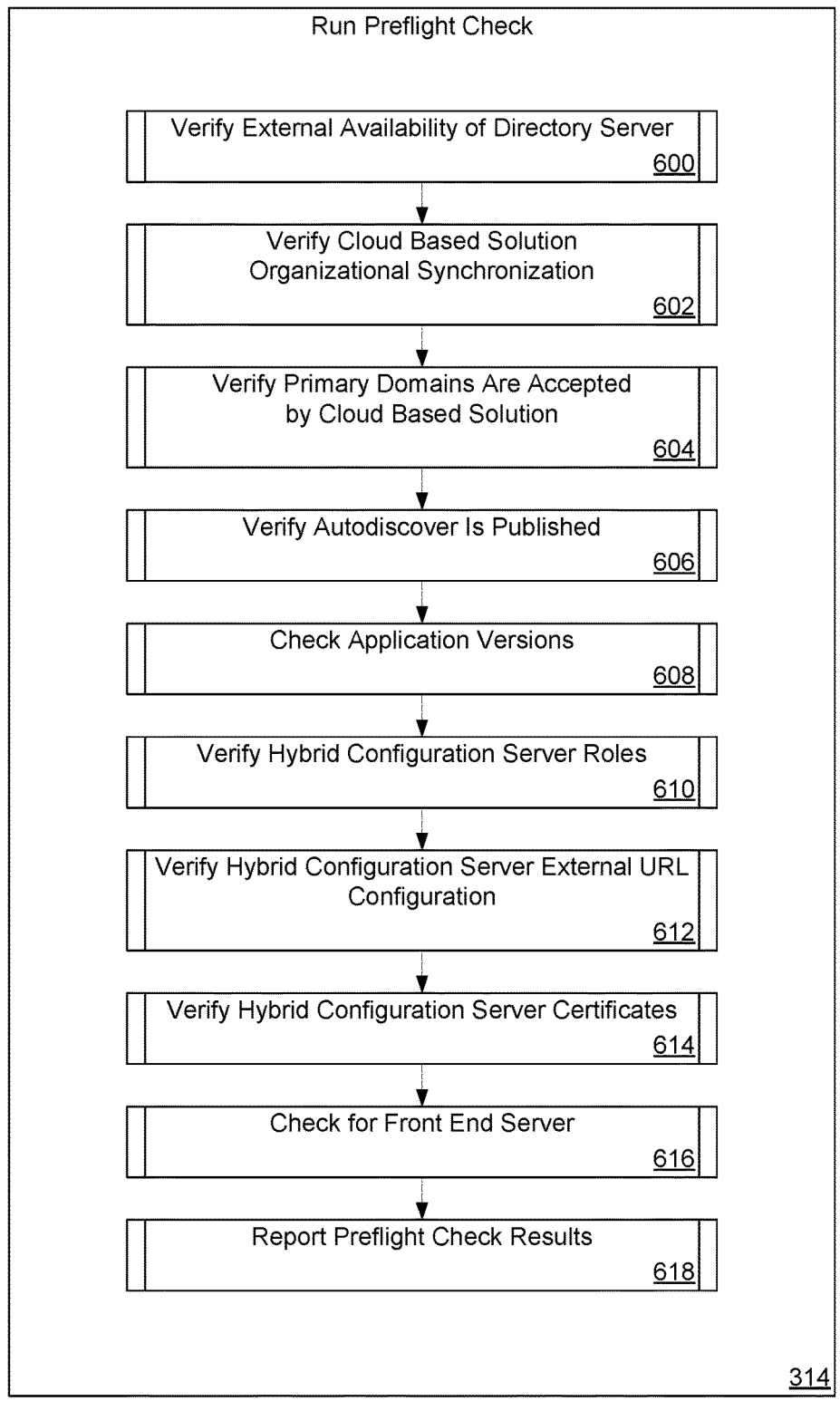
FIG. 6 is a flow diagram showing one embodiment of the step of running a preflight check in greater detail.

FIG. 6 is a flow diagram showing one embodiment of the sub-steps that make up the preflight check (314) run by the hybrid configuration engine 100. The hybrid configuration engine 100 verifies the external availability of the directory services server connected to the local area network (600). The hybrid configuration engine 100 verifies that the cloud-based solution is running a directory synchronization service to synchronize directory information between the on-premise solution and the cloud-based solution (602). The hybrid configuration engine 100 verifies that the primary domains selected by the administrator are provisioned as accepted domains by the cloud-based solution (604). The hybrid configuration engine 100 also verifies that automatic discovery of the on-premise solution is published (606). The hybrid configuration engine 100 verifies that the version of the on-premise application(s), the cloud-based application(s), and/or the hybrid deployment application(s) meet the minimum version requirements for hybrid deployment (608). Additionally, the hybrid configuration engine 100 verifies that the proper server roles are enabled for the open premise solution, the cloud-based solution, and/or the hybrid deployment solution (610). The hybrid configuration engine 100 verifies that the external URLs are properly configured for the hybrid deployment server (612). The hybrid configuration engine 100 verifies that the certificates are properly configured for the hybrid deployment server (614). The hybrid configuration engine 100 checks for the presence of a front end server in the on-premise solution (616). At the conclusion of the preflight check, the hybrid configuration engine 100 optionally displays, logs, or otherwise makes the results available (618) to the administrator 120. In most embodiments, it is not necessary to perform the individual tests included in the preflight check in any particular order. Further, those skilled in the art will recognize that the individual tests included in the preflight check may vary in number and/or type without departing from the scope and spirit of the present invention. For example, in some embodiments, the hybrid configuration engine 100 verifies that the routing domain for each tenant of the cloud-based solution has been created and properly configured.

Figure 7:
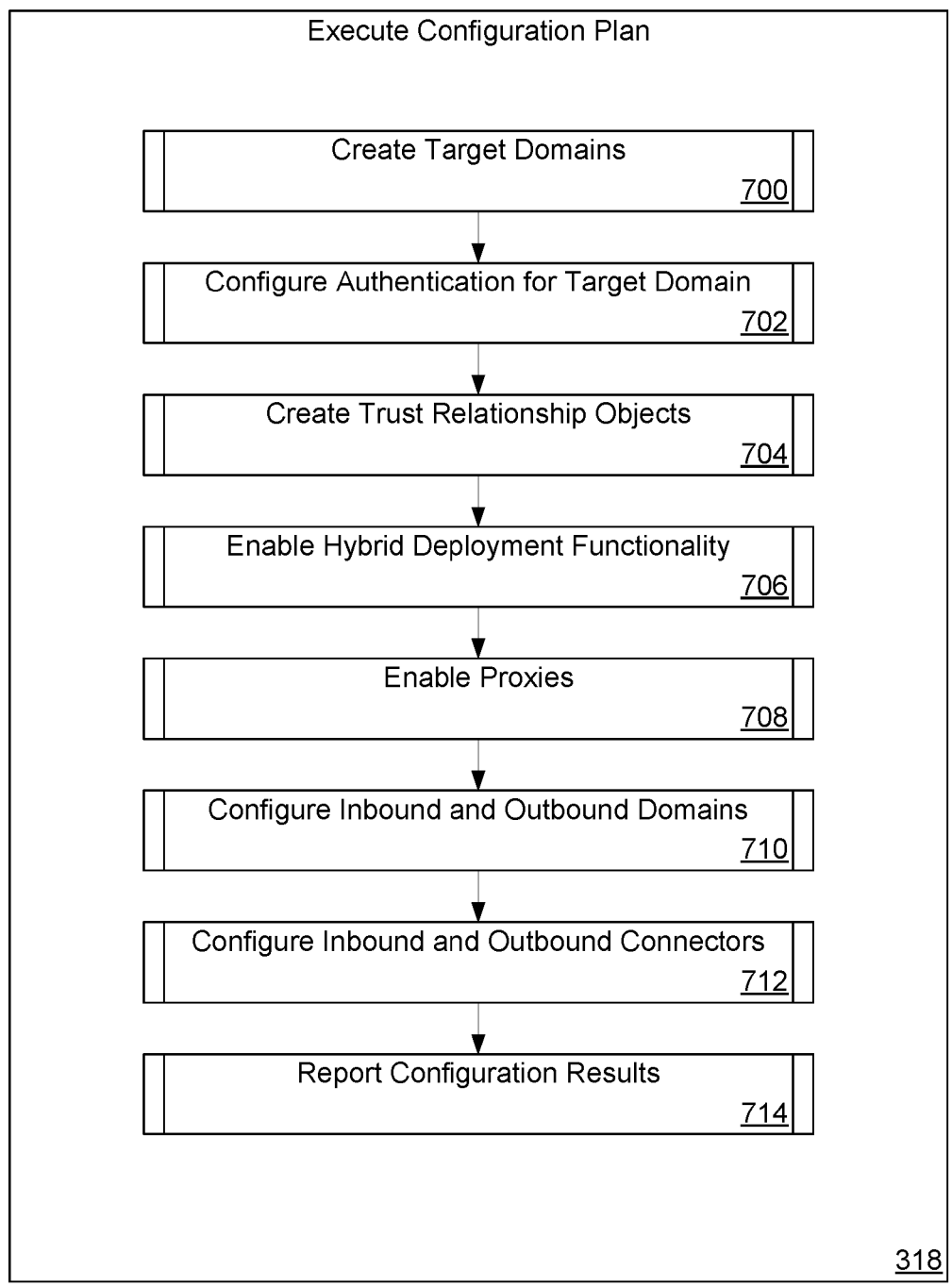
FIG. 7 is a flow diagram showing one embodiment of the step of executing the configuration plan execution in greater detail.

FIG. 7 is a flow diagram showing one embodiment of the sub-steps that make up the first run configuration plan execution step (318). The sub-steps of the configuration plan execution step (318) represent the steps to create the core configuration objects associated with the specific hybrid deployment configuration plan being executed by the hybrid configuration engine 100. In some embodiments, the hybrid configuration engine 100 performs a verification step after each individual task is completed to confirm that each configuration task creates the intended result.

In the illustrated embodiment, the hybrid configuration engine 100 creates hybrid configuration objects such as a target accepted domain and a target remote domain (700) and configures authentication for the target remote domain (702). The hybrid configuration engine 100 also creates trust relationship objects (704) such as a domain proof of ownership token for all primary domains, a trust object, an on-premise solution to cloud-based solution organization relationship, and a cloud-based solution to on-premise solution organization relationship. The hybrid configuration engine 100 enables functionality across the organizational relationships (706) and enables server and/or organization scope proxies used in the hybrid deployment (708). Further, the hybrid configuration engine 100 configures the inbound and outbound remote domains (710) and the server and/or organization scope inbound and outbound connectors for the application and any accessories (712). At the conclusion of the configuration plan execution step, the hybrid configuration engine 100 displays a summary confirming that the features have been enabled or disabled (714), as appropriate. In some embodiments, the summary includes instructions or links to instructions describing how the administrator can test (e.g., end user based tests) to ensure a feature is enabled (i.e., working) or disabled.

In subsequent runs (328), the hybrid configuration engine 100 may perform some or all of the preflight checks (314) and configuration tasks (318) described in relation to FIGS. 6 and 7. Generally, the configuration plan for a subsequent run does not attempt to perform a preflight check or configuration task unless a state change is reported by directory services or related hybrid configuration object has been modified. However, in some embodiments, configuration tasks are reapplied regardless of whether a state change has occurred when the administrator chooses to reapply a configuration plan.

As previously mentioned, the hybrid configuration engine 100 derives the steps for the configuration plan based on an analysis of the current topology and configuration of both the on-premise solution and the cloud-based solution. Neither the on-premise solution nor the cloud-based solution holds the master configuration. Mirroring a master configuration between the on-premise solution and the cloud-based solution presumes that the configuration of the two solutions is identical. Instead, the hybrid configuration engine 100 executes specific configuration tasks against the on-premise solution and specific configuration tasks against the cloud-based solution. The tasks executed against the on-premise solution do not have to be the same tasks executed against the cloud-based solution. Because the configuration is automated and uses the same desired configuration state information, the configuration of the on-premise solution and the cloud-based solution is consistent and repeatable. As a result, the hybrid configuration engine 100 effectively eliminates configuration inconsistencies between the on-premise solution and the cloud-based solution.

Moreover, the hybrid configuration engine 100 offers increased flexibility by being able to independently configure two or more distinct solutions to achieve a hybrid deployment of those solutions. In other words, it does not matter whether the solutions participating in the hybrid deployment are from the same vendor or otherwise matched. As long as the target solutions are designed for hybrid deployment and the hybrid configuration engine 100 understands how to configure the target solutions, the burden on the administrator is reduced to providing the desired configuration state. Conveniently, the hybrid configuration engine 100 handles most of the details of configuring the hybrid deployment so that the administrator does not have to learn how to integrate various solutions in a hybrid deployment environment.

The hybrid configuration engine described herein is useful to establish hybrid deployments in a variety of different technologies that are spread between on-premises and cloud.

Embodiments of the present invention automatically configure some or all of the hybrid deployment allowing the cloud-based solution and the on-premises solution to interoperate and share functionality to provide a substantially seamless and transparent experience to end users. Examples of suitable technologies include, but are not limited to, collaborative communication solutions, e-mail solutions, database solutions, information management solutions, content management solutions, and customer relationship management solutions.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 8:
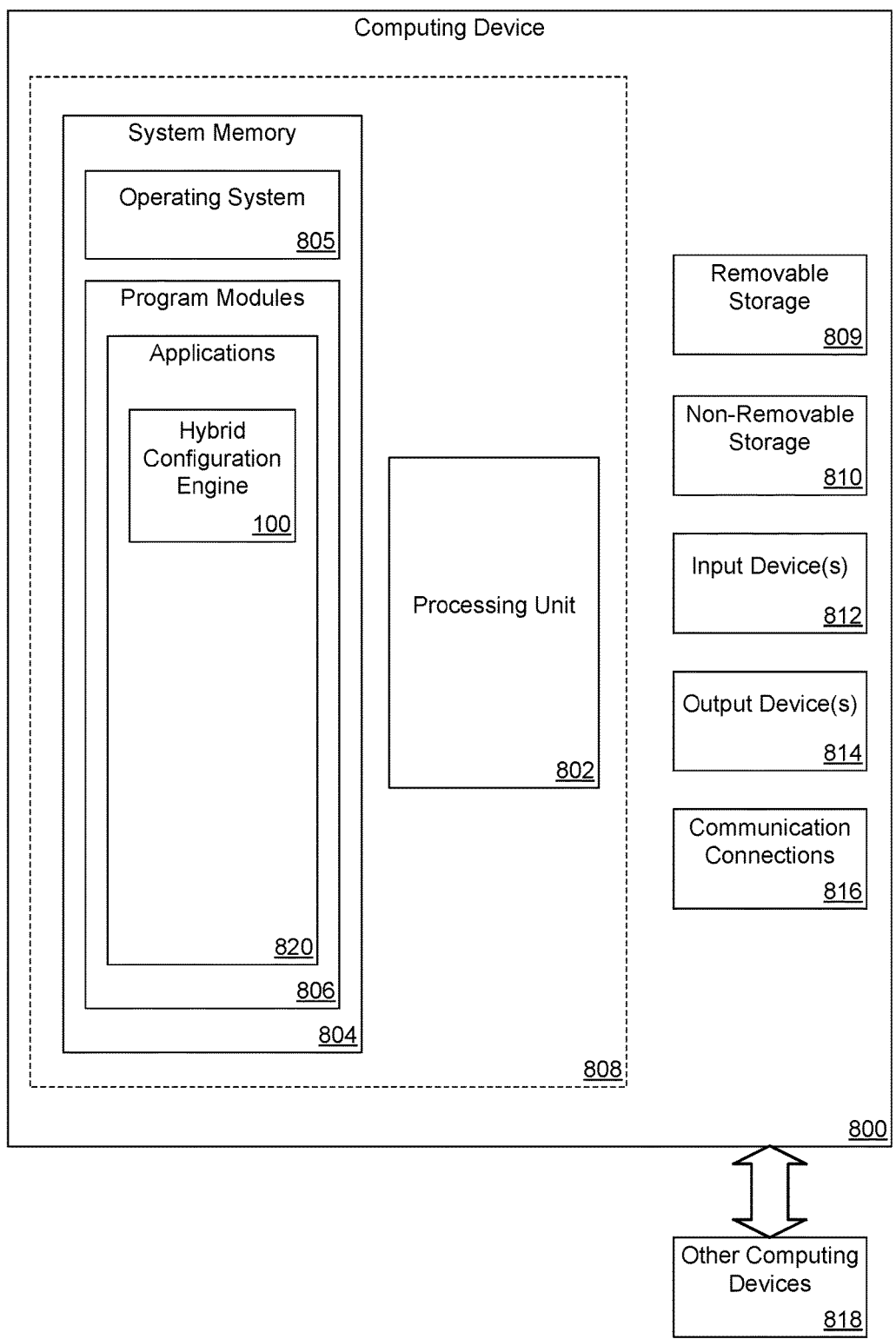
FIG. 8 is a simplified block diagram of a computing device with which embodiments of the present invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 8 through 10 and the associated descriptions provide a discussion of a variety of operating environments in which embodiments of the invention may be practiced. However, the devices and systems illustrated and discussed with respect to FIGS. 8 through 10 are for purposes of example and illustration and are not limiting of a vast number of computing device configurations that may be utilized for practicing embodiments of the invention, described herein.

FIG. 8 is a block diagram illustrating exemplary physical components (i.e., hardware) of a computing device 800 with which embodiments of the invention may be practiced. The computing device components described below may be suitable for the computing devices described above, for example, the hybrid deployment server 104, the on-premise application server 106, the cloud-based application server 110, and the client computing device 118. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running applications 820 such as client applications (e.g., a user agent/web browser) or server applications (e.g., the hybrid configuration engine 100, the on-premise application 108, and the cloud-based application 112). The operating system 805, for example, may be suitable for controlling the operation of the computing device 800. Furthermore, embodiments of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806, such as the hybrid configuration engine 100, the on-premise application 108, and the cloud-based application 112 may perform processes including, for example, one or more of the stages of the method shown in FIGS. 3 through 7. The aforementioned process is an example, and the processing unit 802 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the hybrid configuration engine 100, the on-premise application 108, and the cloud-based application 112 may be operated via application-specific logic integrated with other components of the computing device 800 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 804, the removable storage device 809, and the non-removable storage device 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 800. Any such computer storage media may be part of the computing device 800.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
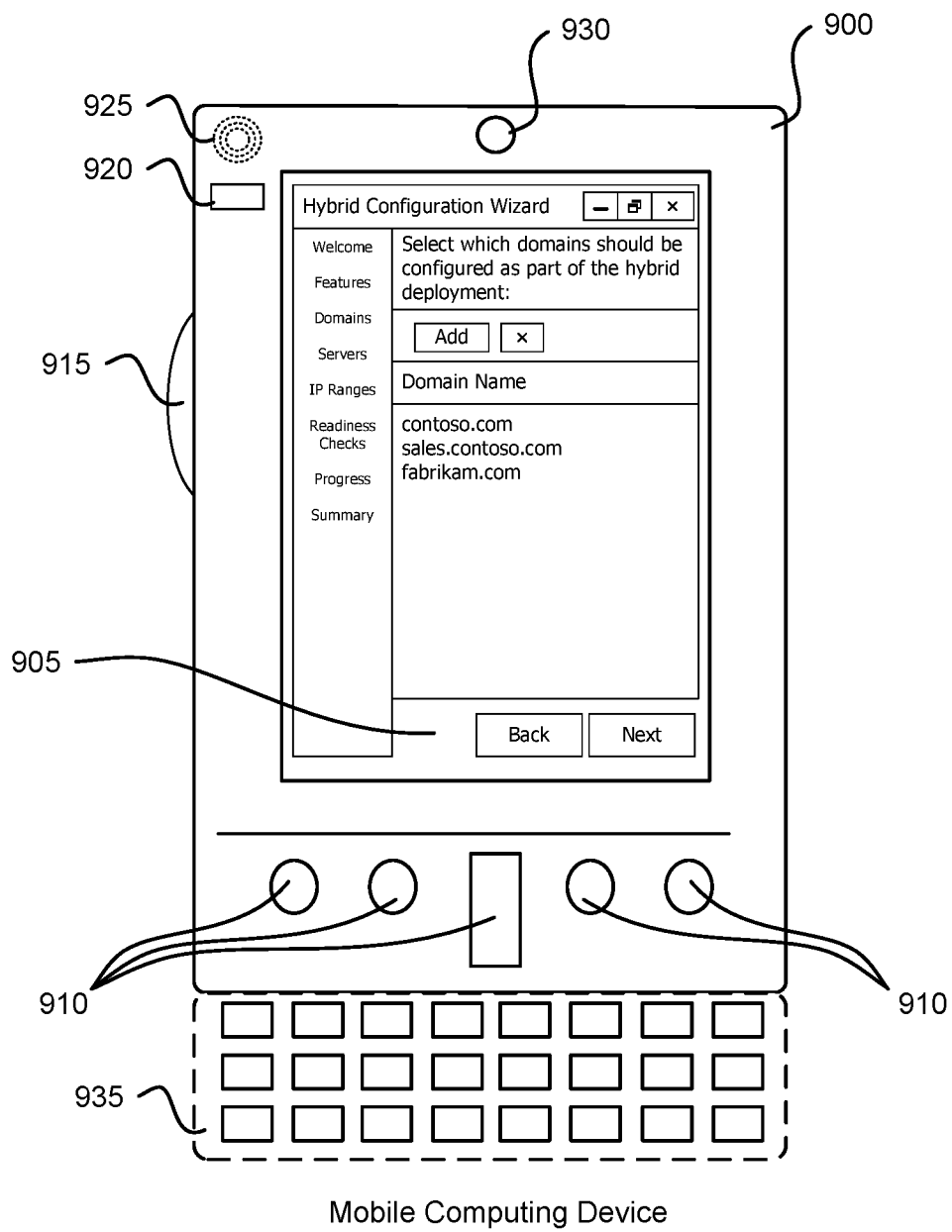
FIG. 9A is an exemplary mobile computing device executing one embodiment of the hybrid configuration engine.
Figure 9B:
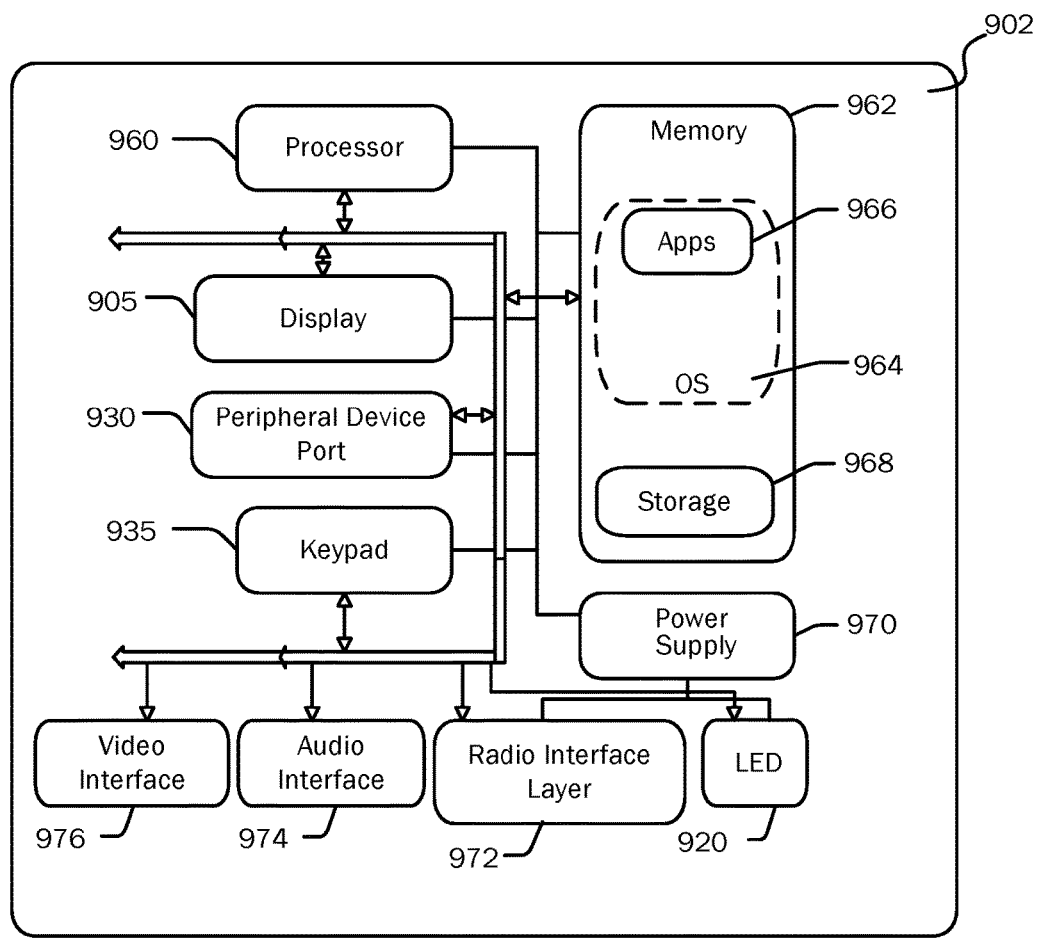
FIG. 9B are simplified block diagrams of a mobile computing device with which embodiments of the present invention may be practiced.
Figure 10:
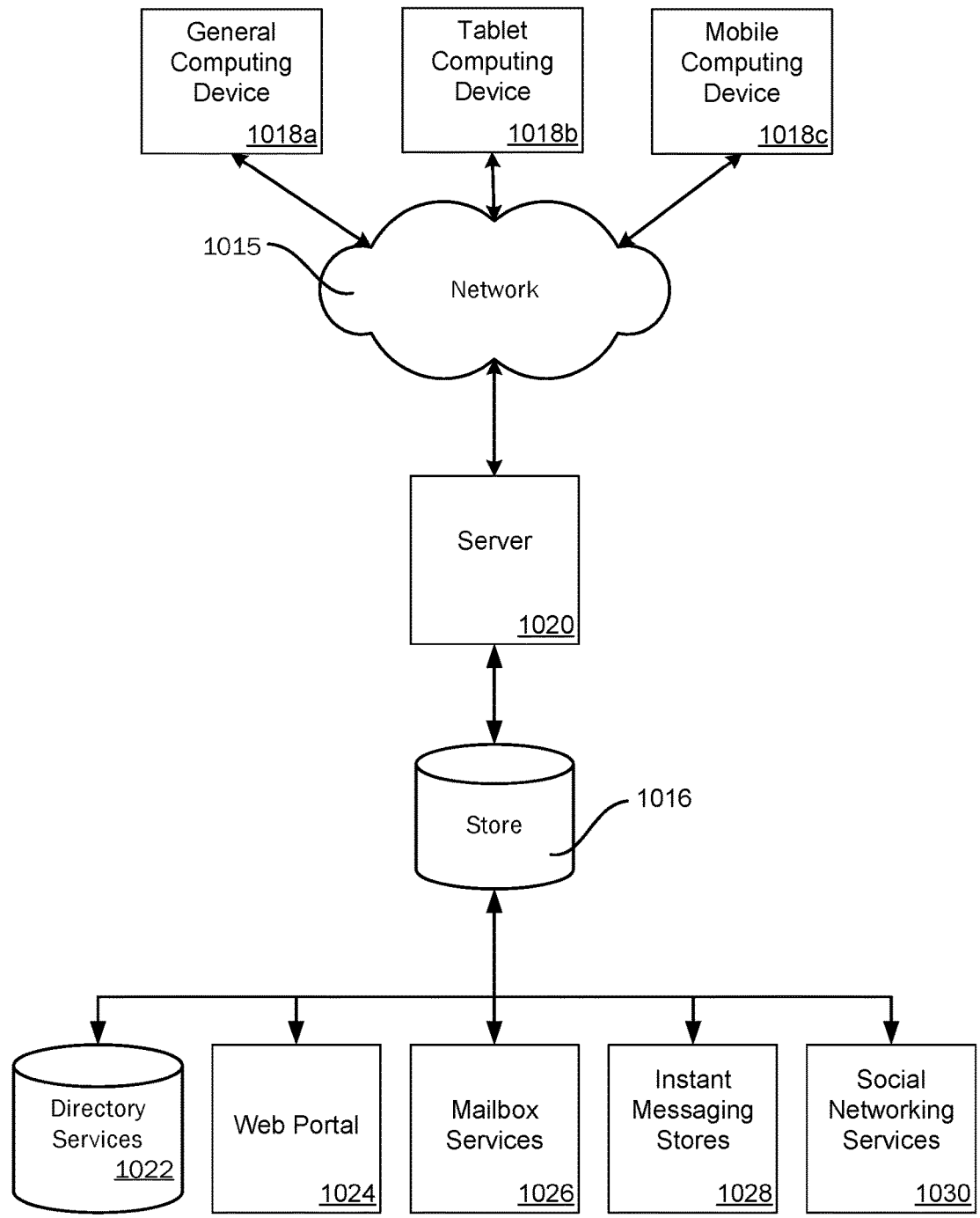
FIG. 10 is a simplified block diagram of a distributed computing system in which embodiments of the present invention may be practiced.

FIGS. 9A and 9B illustrate a mobile computing device 900, for example, a mobile telephone, a smart phone, a tablet personal computer, a laptop computer, and the like, with which embodiments of the invention may be practiced. With reference to FIG. 9A, an exemplary mobile computing device 900 for implementing the embodiments is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative embodiments, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some embodiments, the mobile computing device 900 incorporates a vibration transducer for providing the user with tactile feedback. In yet another embodiment, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 900 can incorporate a system (i.e., an architecture) 902 to implement some embodiments. In one embodiment, the system 902 is implemented as a "smart phone" capable of running one or more applications (e.g., browser, e-mail, calendaring, contact managers, messaging clients, games, and media clients/players). In some embodiments, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the hybrid configuration engine 100, the on-premise application 108, and the cloud-based application 112, described herein.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world", via a communications carrier or service provider. Transmissions to and from the radio 972 are conducted under control of the operating system 964. In other words, communications received by the radio 972 may be disseminated to the application programs 966 via the operating system 964, and vice versa.

The radio 972 allows the system 902 to communicate with other computing devices, such as over a network. The radio 972 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 902 provides notifications using the visual indicator 920 that can be used to provide visual notifications and/or an audio interface 974 producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968. Computer storage media may include volatile and nonvolatile, removable and non-removable media implemented in any method or technology for storage of information, such as computer readable instructions, data structures, program modules, or other data.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates one embodiment of the architecture of a system for providing the hybrid configuration engine 100, the on-premise application 108, and the cloud-based application 112 to one or more client devices, as described above. Content developed, interacted with or edited in association with the hybrid configuration engine 100, the on-premise application 108, and the cloud-based application 112 may be stored in different communication channels or other storage types. For example, various documents may be stored using a directory service 1022, a web portal 1024, a mailbox service 1026, an instant messaging store 1028, or a social networking site 1030. The hybrid configuration engine 100, the on-premise application 108, and the cloud-based application 112 may use any of these types of systems or the like for enabling data utilization, as described herein. A server 1020 may provide the hybrid configuration engine 100, the on-premise application 108, and the cloud-based application 112 to clients. As one example, the server 1020 may be a web server providing the hybrid configuration engine 100, the on-premise application 108, and the cloud-based application 112 over the web. The server 1020 may provide the hybrid configuration engine 100, the on-premise application 108, and the cloud-based application 112 over the web to clients through a network 1015. By way of example, the client computing device 118 may be implemented as the computing device 800 and embodied in a personal computer 1018a, a tablet computing device 1018b and/or a mobile computing device 1018c (e.g., a smart phone). Any of these embodiments of the client computing device 118 may obtain content from the store 1016.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A method for configuring a hybrid deployment of an on-premise component and a cloud-based component in a target environment, the method comprising:
   obtaining a desired configuration state for the hybrid deployment of the on-premise component and the cloud-based component;
   collecting a current configuration state of the on-premise component and a current configuration state of the cloud-based component;
   determining one or more differences between the current configuration state of one or more of the on-premise component and the cloud-based component and the desired configuration state for the hybrid deployment of the on-premise component and the cloud-based component;
   deriving a set of configuration tasks based on the differences to configure the hybrid deployment of the on-premise component and the cloud-based component to achieve the desired configuration state;
   incorporating the set of configuration tasks into a configuration plan; and
   executing the configuration plan to establish the hybrid deployment of the on-premise component and the cloud-based component.

2. The method of claim 1, further including:
   deriving a first set of configuration tasks to configure the on-premise component for the hybrid deployment; and
   deriving a second set of configuration tasks to configure the cloud-based component for the hybrid deployment.

3. The method of claim 2, wherein incorporating the set of configuration tasks into the configuration plan further comprises combining the first set of configuration tasks and the second set of configuration tasks into the configuration plan.

4. The method of claim 1, wherein executing the configuration plan further comprises:
executing a selected configuration task from the configuration plan;
obtaining a result from executing the selected configuration task; and
verifying the result matches an intended result for the selected configuration task.

5. The method of claim 1, further comprising:
collecting administrative credentials for connecting to the on-premise component and the cloud-based component;
connecting to a configuration endpoint of the on-premise component; and
connecting to a configuration endpoint of the cloud-based component.

6. The method of claim 1, further comprising:
creating a set of hybrid configuration objects during execution of a first run configuration plan, each hybrid configuration object corresponding to at least one hybrid deployment feature.

7. The method of claim 6, further comprising:
enabling or disabling the at least one hybrid deployment feature by modifying a corresponding hybrid configuration object during a subsequent run of the method within the target environment.

8. The method of claim 6 further comprising:
collecting topology information for the target environment;
analyzing the topology information to determine whether or not the method has been previously executed; and
selecting the first run configuration plan when the method has not been previously executed on the target environment.

9. The method of claim 1, further comprising providing information about additional tasks to be completed in order to finalize the configuration plan.

10. The method of claim 1, further comprising performing a preflight check to determine whether or not the target environment meets a minimum set of prerequisites for the desired configuration state.

11. A system for configuring a hybrid deployment of an on-premise component and a cloud-based component in a target environment, the system further comprising:
at least one processing unit; and
non-volatile storage comprising instructions that, when executed by the at least one processing unit, are operable to:
obtain a desired configuration state for the hybrid deployment of the on-premise component and the cloud-based component;
collect a current configuration state of the on-premise component and a current configuration state of the cloud-based component;
determining one or more differences between the current configuration state of one or more of the on-premise component and the cloud-based component and the desired configuration state for the hybrid deployment of the on-premise component and the cloud-based component;
derive a configuration plan based on the differences to configure the hybrid deployment of the on-premise component and the cloud-based component to achieve the desired configuration state, the configuration plan comprising a set of configuration tasks; and
execute the configuration plan to establish the hybrid deployment of the on-premise component and the cloud-based component.

12. The system of claim 11, wherein the instructions are further operable to provide information about performing additional tasks to be performed in order to complete the configuration plan.

13. The system of claim 11, wherein the instructions are further operable to:
execute a selected configuration task from the configuration plan;
obtain a result from executing the selected configuration task; and
verify that the result matches an intended result for the selected configuration task.

14. The system of claim 11, wherein the instructions are further operable to:
collect administrative credentials for connecting to the on-premise component;
connect to the on-premise component;
collect administrative credentials for connecting to the cloud-based component; and
connect to the cloud-based component.

15. The system of claim 11, wherein the instructions are further operable to create a set of hybrid configuration objects during execution of a first run configuration plan, each hybrid configuration object corresponding to at least one hybrid deployment feature.

16. The system of claim 15, wherein the instructions are further operable to enable or disable the at least one hybrid deployment feature during a subsequent run configuration plan within the target environment by modifying a corresponding hybrid configuration object.

17. The system of claim 15, wherein the instructions are further operable to:
collect topology information for the target environment;
analyze the topology information to determine whether or not the target environment has been previously configured; and
select the first run configuration plan when the target environment has not previously been configured.

18. The system of claim 11, wherein the instructions are further operable to provide information about additional tasks to be completed in order finalize configuration of the configuration plan.

19. The system of claim 11, wherein the instructions are further operable to perform a preflight check to determine whether or not the target environment meets a minimum set of prerequisites for the desired configuration state.

20. A non-volatile computer readable storage medium containing computer readable instructions which, when executed by a computer, perform a method to establish a hybrid deployment of an on-premise component and a cloud-based component in a target environment, the method comprising:
obtaining a desired hybrid configuration state for the hybrid deployment of the on-premise component and the cloud-based component;
collecting on-premise administrative credentials for connecting to the on-premise component;
connecting to a configuration endpoint of the on-premise component;
collecting a current configuration state of the on-premise component from the on-premise component;

collecting cloud-based administrative credentials for connecting to the cloud-based component;
connecting to a configuration endpoint of the cloud-based component;
collecting a current configuration state of the cloud-based component from the cloud-based component;
performing a preflight check to determine whether or not the target environment meets a minimum set of prerequisites for the desired hybrid configuration state;
determining one or more differences between the current configuration state of one or more of the on-premise component and the cloud-based component and the desired hybrid configuration state for the hybrid deployment of the on-premise component and the cloud-based component;
deriving a set of configuration tasks based on the differences to configure the hybrid deployment of the on-premise component and the cloud-based component to achieve the desired hybrid configuration state;
incorporating the set of configuration tasks into a configuration plan;
creating a set of configuration objects corresponding to a set of hybrid deployment features during a first run of the method within the target environment;
executing a selected configuration task of the configuration plan;
obtaining a result from executing the selected configuration task;
verifying the result matches an intended result for the selected configuration task;
repeatedly executing another configuration task until each configuration task of the configuration plan has been executed to establish the hybrid deployment of the on-premise component and the cloud-based component; and
providing information about additional tasks to be completed in order finalize configuration of the configuration plan.

\* \* \* \* \*